United States Patent
Webster

(10) Patent No.: US 6,279,468 B1
(45) Date of Patent: Aug. 28, 2001

(54) ROLL-UP GRILL WITH INTEGRAL FOLD-UP SUPPORT FRAME

(76) Inventor: Timothy Webster, 5084 Stoneywood Cir., Mableton, GA (US) 30126

(*) Notice: Subject to any disclaimer, the term of this patent is extended or adjusted under 35 U.S.C. 154(b) by 0 days.

(21) Appl. No.: 09/735,880

(22) Filed: Dec. 13, 2000

(51) Int. Cl.[7] .............. A47J 33/00; A47J 37/00; A47J 37/07; F24C 1/16
(52) U.S. Cl. .............. 99/449; 99/450; 99/482; 126/9 R; 126/9 B; 126/25 R; 126/30
(58) Field of Search .............. 99/339, 340, 444–450, 99/400, 401, 481, 482; 126/9 R, 9 A, 9 B, 25 R, 25 A, 29, 30; 211/181.1; 108/111–113

(56) References Cited

U.S. PATENT DOCUMENTS

| | | | | |
|---|---|---|---|---|
| 718,714 | * | 1/1903 | Larson | 99/449 X |
| 793,151 | * | 6/1905 | Palmer | 126/30 X |
| 1,473,056 | * | 11/1923 | Steen | 126/9 B |
| 3,537,388 | * | 11/1970 | Martin | 126/9 R |
| 3,828,759 | * | 8/1974 | Cooper | 126/25 R |
| 4,120,279 | * | 10/1978 | White | 99/340 |
| 4,191,160 | * | 3/1980 | Elliott | 126/9 R |
| 4,724,753 | * | 2/1988 | Neyman et al. | 99/339 |
| 4,754,871 | | 7/1988 | Gustafson | 198/848 |
| 4,977,824 | * | 12/1990 | Shinler | 99/449 |
| 5,317,561 | * | 5/1994 | Shiner | 99/449 |
| 5,317,961 | | 6/1994 | Shinler | 99/449 |
| 5,452,706 | | 9/1995 | Meza | 126/30 |

* cited by examiner

Primary Examiner—Timothy F. Simone
(74) Attorney, Agent, or Firm—Sutherland Asbill & Brennan LLP

(57) ABSTRACT

A roll-up grill having an integral and foldable frame. The roll-up grill comprises a flexible grill surface, such as a wire mesh grid. The integral frame comprises a first end frame member attached laterally to a first end of the flexible grill surface and a second end frame member attached laterally to a second end of the flexible grill surface such that the flexible grill surface, the first end frame member and the second end support member are oriented in a parallel plane. The first end frame member and the second end frame member each comprise an end support member having a proximal end and a distal end, a side support member pivotally connected to one of the proximal end or the distal end of the end support member, a proximal leg support member being pivotally connected to the end support member at the proximal end and a distal leg support member being pivotally connected to the end support member at the distal end.

15 Claims, 8 Drawing Sheets

ROLL-UP GRILL WITH INTEGRAL FOLD-UP SUPPORT FRAME

TECHNICAL FIELD

The present invention relates to portable cooking grills used to cook food items. More particularly, the present invention relates to a lightweight portable cooking grill having an integral support frame, all of which may be rolled into a substantially cylindrical shape for convenient storage and transport.

BACKGROUND OF THE INVENTION

A roll-up grill is a small grilling device having a flexible grilling surface that can be rolled into a substantially cylindrical shape. In a rolled-up configuration, a roll-up grill is compact and lightweight and is therefore easily stored and transported. Portable roll-up grills are thus useful in connection with such outdoor activities as camping, hiking, picnics, tailgate parties, and the like. However, prior art roll-up grills are limited in utility as either being subject to instability or as having too many parts.

For example, U.S. Pat. No. 5,317,961 describes a roll-up campfire cooking grill. The roll-up campfire cooking grill comprises a grill surface constructed from a plurality of bars, each having a straight, stiff, longitudinally extending, central rod spaced from and mutually parallel with respect to every other central rod. Each bar further includes two generally "J-shaped" hook portions, one at each end of the central rod. The bars are assembled together such that the J-shaped hooks of a leading bar extend under the central rod of the next adjacent trailing bar with both J-shaped hooks of that leading bar extending outwardly over and above the J-shaped hooks of the trailing bar. Accordingly, the roll-up campfire cooking grill may be rolled-up and stored in a cylindrical container or bag.

The roll-up campfire cooking grill may be supported by table legs that are pivotally mounted to the corners of the grill surface. The leg members are described as being similar in shape to aluminum tent pegs, implying that they may be driven into the ground to support the grill surface. Of course, driving the table legs into a hard ground may be difficult and/or practically impossible. Aside from the table legs, the roll-up grill does not otherwise include a support frame and is thus susceptible to instability. The weight of food items placed atop of the grill surface may cause the grill surface to bend downward toward the heat source. Dealing with an instable grill is particularly troublesome when the grill surface is hot.

As another example, U.S. Pat. No. 5,452,706 describes a roll-up barbecue apparatus having a grill surface comprising a series of longitudinally extending, laterally spaced grill rods connected by laterally extending, longitudinally spaced flexible cables. The rods and cables of the grill surface may thus be rolled into a bundle for storage and transport. The grill surface may be supported by a frame structure comprising certain lateral frame elements, longitudinal frame elements and four legs, all of which are fastened together by way of nuts or the like. The longitudinal frame elements remain loosely assembled to the cables of the grill surface, while the lateral frame elements and the four legs must be dissembled and detached prior to rolling-up the grill surface. The need to assemble and disassemble portions of the support frame is an inconvenience to the user. Also, detached frame elements are subject to being lost. If the elements of the frame structure are lost, the grilling surface becomes unstable.

Accordingly, there remains a need for a roll-up grill that provides a stable grilling surface supported by a support frame that does not require disassembly for storage and transport.

SUMMARY OF THE INVENTION

The present invention meets the above described need by providing a roll-up grill having an integral and foldable frame. The roll-up grill comprises a flexible grill surface, such as a wire-mesh grid. The integral frame of the roll-up grill comprises first and second end frame members that remain attached to the flexible grill surface in the rolled and unrolled configurations. Each end frame member is a foldable collection of components comprising an end support member, a side support member and two leg support members. The end support members each have a proximal end and a distal end and comprise a top flange and a side flange. The top flange of the end support member is oriented in plane parallel to that of the flexible grill surface and the side flange is oriented in a plane that is perpendicular to the flexible grill surface. The top flange and the side flange form a substantially right angle with respect to each other. The side support member is pivotally connected to one end of the top flange and is oriented in a parallel plane with respect to the top flange such that the side support member may be pivoted between a position that is parallel to the end support member to a position that is perpendicular to the end support member. The proximal leg support member and the distal leg support member are pivotally connected to the side flange of the end support member at the proximal end and the distal end, respectively. The proximal leg support member is oriented in a parallel plane with respect to the side flange such that the proximal leg support member may be pivoted from a position that is parallel to the end support member to a position that is perpendicular to the end support member. Similarly, the distal leg support member is oriented in a parallel plane with respect to the side flange such that the distal leg support member may be pivoted from a position that is parallel to the end support member to a position that is perpendicular to the end support member. The flexible grill surface may be attached to the end frame members, for example, by way of pins interwoven through the ends of the flexible grill surface and inserted into holes that are laterally spaced along each end frame member. After inserting the pins through the holes, the ends of the pins may be bent or crimped so that the pins may not be easily withdrawn from the holes.

BRIEF DESCRIPTION OF THE DRAWINGS

The invention is illustrated by the accompanying drawings in which like numerals represent like and in which.

DETAILED DESCRIPTION EXEMPLARY EMBODIMENTS

A roll-up grill having a flexible grill surface and an integral support frame is provided. The support frame includes two end support members and two side support members for supporting the ends and sides of the flexible grill surface, respectively. In an exemplary embodiment, the flexible grill surface is relatively flat and substantially rectangular. The grill surface preferably comprises a wire mesh grid that is attached to each end support members of the support frame. The support frame also includes leg support members for raising the grill surface above the heat source. Two leg support members and one side support member are pivotally attached to each end support member. The leg support members and the side support members may thus be folded to positions that are parallel to the end support member to which they are attached. With the leg support members and side support members folded parallel to their respective end support member, the grill surface and frame may be rolled-up without detachment of any components.

Figure 1:
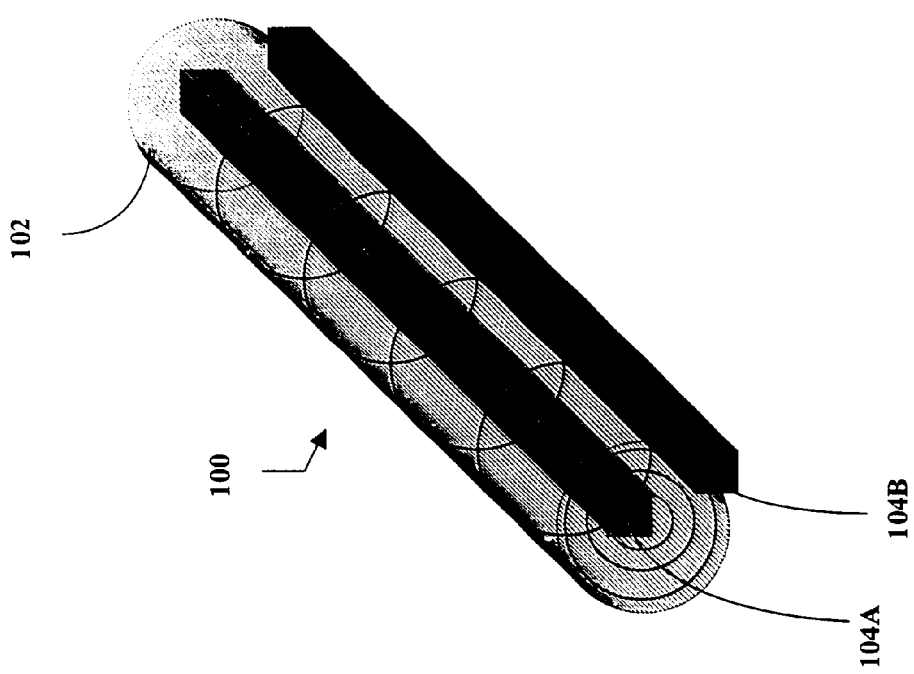
FIG. 1 is a perspective view of an exemplary roll-up grill in a rolled-up configuration, according to the present invention.

In order to more particularly point out the invention, exemplary embodiments thereof will now be described with reference to the drawings. FIG. 1 is a perspective view of an exemplary roll-up grill 100 in a rolled-up configuration, according to the present invention. As shown, the exemplary roll-up grill 100 comprises a flexible grill surface 102 and two attached end frame members 104A&B. The end frame members 104A&B include all frame components in a folded configuration. The frame components will be described in greater detail below. In its rolled-up configuration, the roll-up grill 100 forms a substantially cylindrical shape. The end frame components 104A&B remain attached to the flexible grill surface 102 when the roll-up grill 100 is in it rolled-up configuration.

Figure 2:
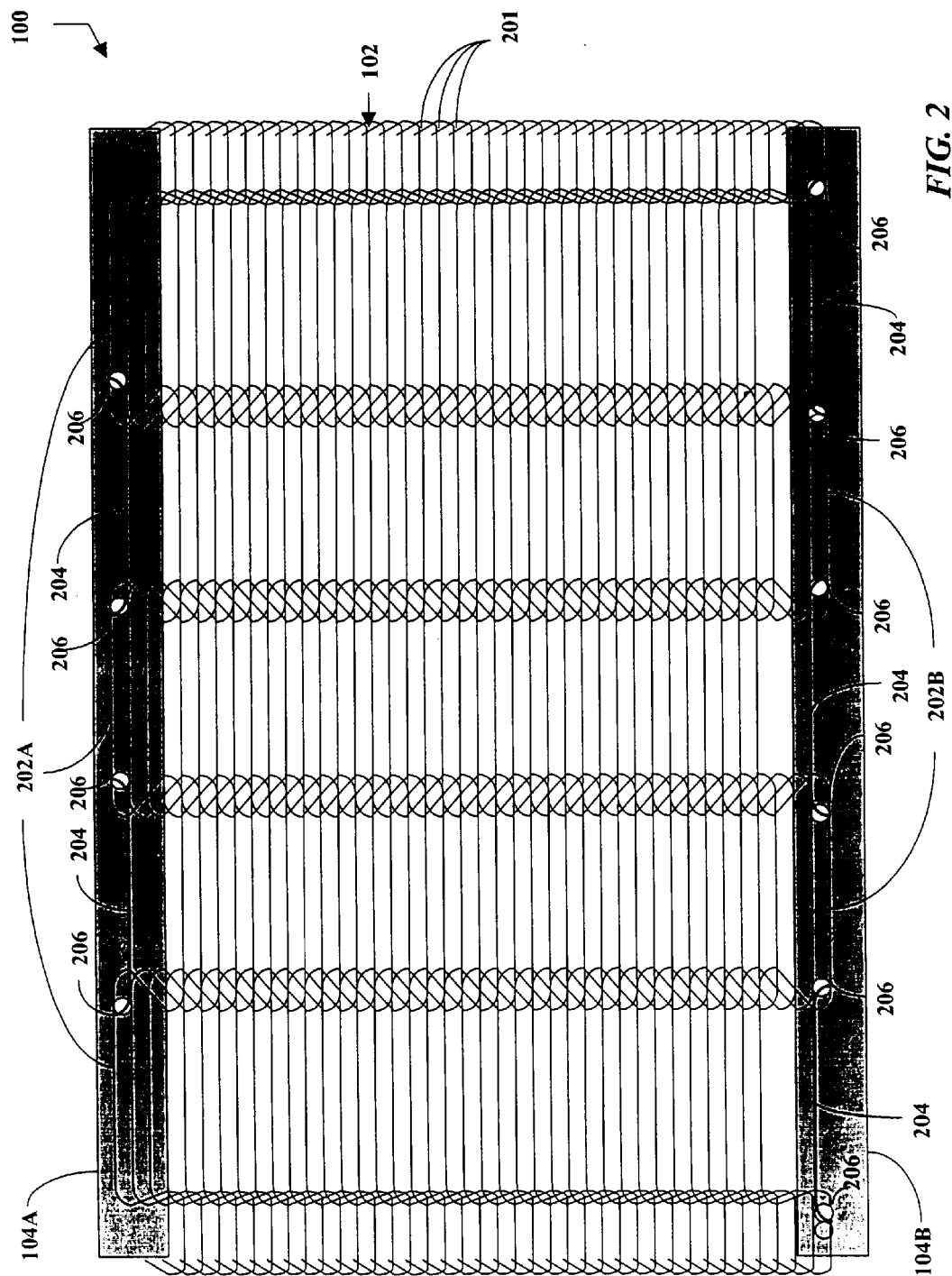
FIG. 2 is a plan view showing the top-side of the exemplary roll-up grill in an unrolled configuration.

FIG. 2 is a plan view showing the topside of the exemplary roll-up grill 100 in an unrolled configuration. The unrolled flexible grill surface 102 comprises a substantially flat and substantially rectangular surface. The flexible grill surface 102 should be made from a heat-tolerant material that will not deform when exposed to a heat source for cooking food items. Preferably, the flexible grill surface 102 is made from stainless steel. However, the flexible grill surface 102 may be made from other suitable materials as well. As shown in FIG. 2, the flexible grill surface 102 may comprise any well-known and widely available wire mesh grid formed from a plurality of interlocking, laterally extending, rigid steel zigzag wires 201. The wire mesh embodiment of the flexible grill surface 102 will be discussed in further detail with reference to FIG. 5, below. Of course, flexible grill surfaces 102 other than wire mesh grids may be used in accordance with the present invention.

The flexible grill surface 102 has a first end 202A, a second end 202B, a first side 203A and a second side 203B. The flexible grill surface is capable of being rolled-up into a substantially cylindrical shape, as was illustrated in FIG. 1, with the first side 203A and the second side 203B forming the curved portions thereof. The first end 202A of the flexible grill surface 102 is attached laterally (parallel to the laterally extending wires 201 of the flexible grill surface 102) to a first end frame member 104A and the second end 202B of the flexible grill surface 102 is attached laterally to a second end frame member 104B. The ends 202A&B of the flexible grill surface 102 may be attached to the end frame members 104A&B with any suitable type of fastener that will not fail when exposed to high temperatures. In a preferred embodiment, pins 204 are used to secure the ends 202A&B of the flexible grill surface 102 to the end frame members 104A&B. The pins 204 interlock with the ends 202A&B of the flexible grill surface 202 as shown in FIG. 2. The ends of the pins 204 may be pushed into holes 206 appropriately spaced along the end frame members 104A&B. After being pushed through the holes 206, the ends of the pins 204 may be bent or crimped in such a manner as to prohibit the pins 204 from being easily withdrawn from the holes 206. The pins 204 may be constructed from the same material as the flexible grill surface 102, for example stainless steel.

Figure 3:
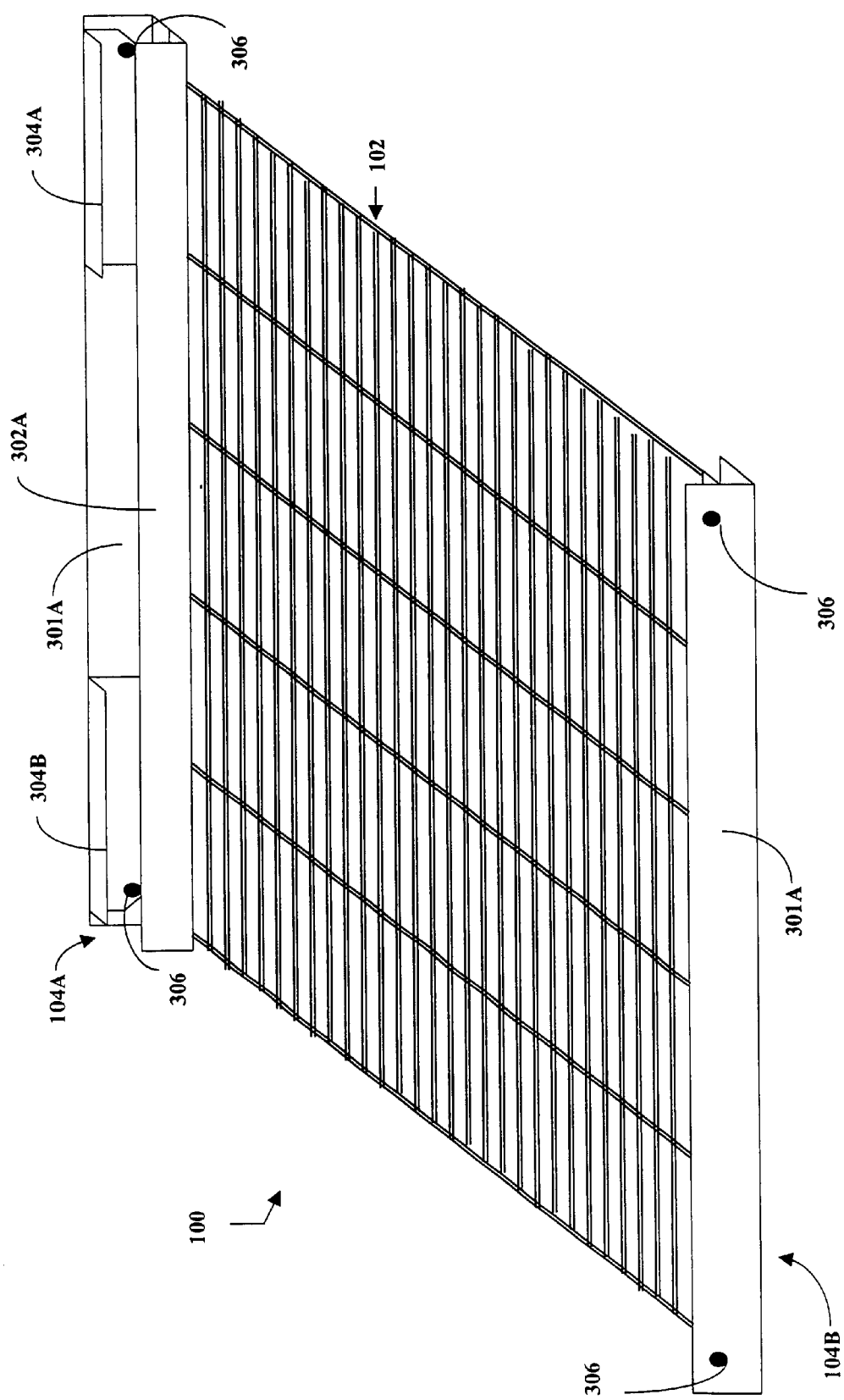
FIG. 3 is a perspective view showing the bottom-side of the exemplary roll-up grill in an unrolled configuration with end frame members being in a folded configuration.

FIG. 3 is a perspective view showing the bottom-side of the exemplary roll-up grill 100 in an unrolled configuration with the end frame members 104A&B being in a folded configuration. The grill surface 102 shown in this figure is simplified as compared to that shown in FIG. 2. As shown with respect to a first end frame member 104A, each end frame member 104A&B comprises a plurality of pivotally connected components. The components of the first end frame member comprise an end support member 301A, a side support member 302A, a proximal leg support member 304A and a distal leg support member 304B. The components of the end frame members 104A&B may be pivotally connected by any suitable fastener, such as a rivet 306 or bolt, that will not fail when exposed to high temperatures.

Figure 4:
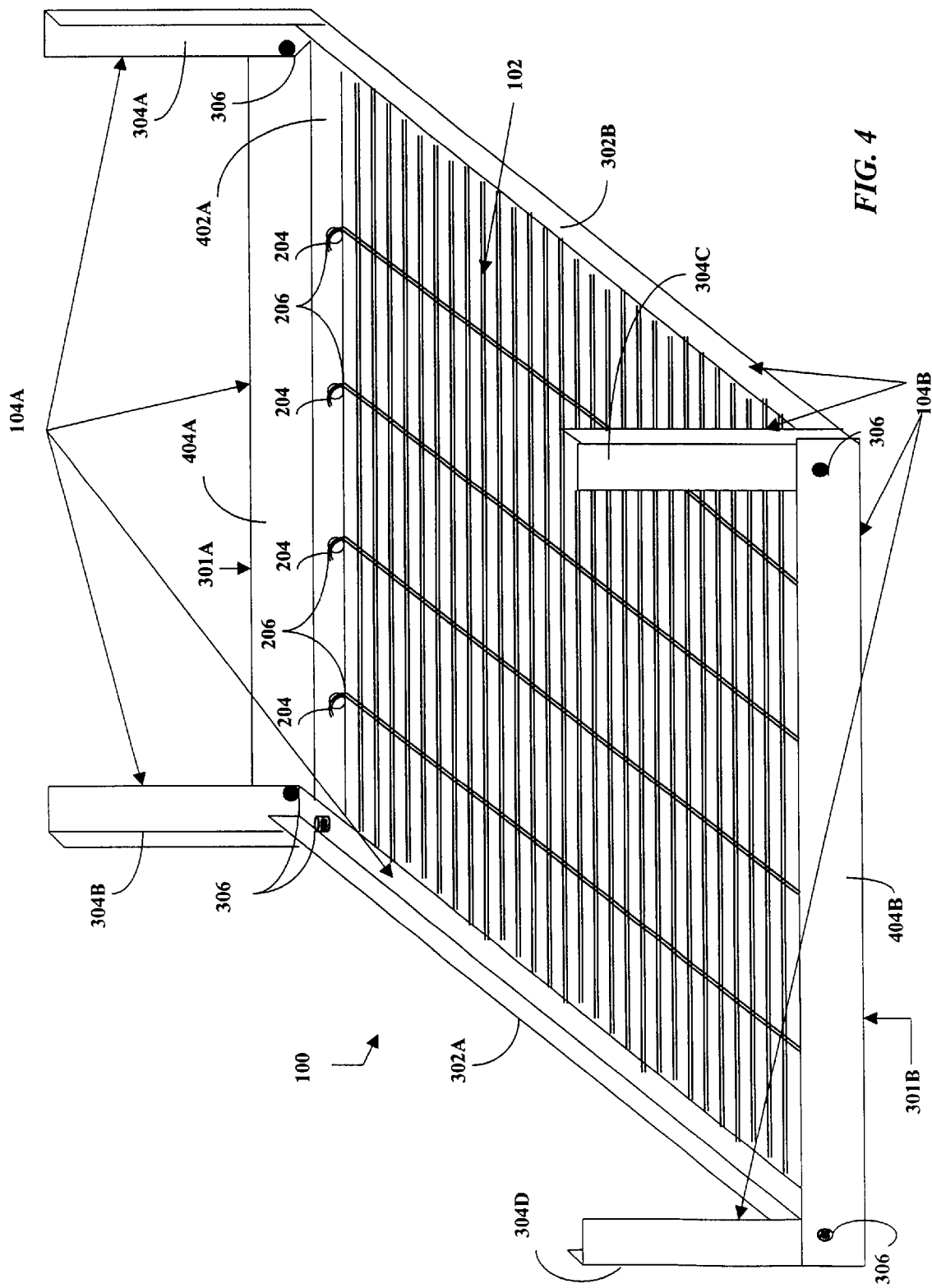
FIG. 4 is a perspective view showing the bottom-side of the exemplary roll-up grill in an unrolled configuration with end frame members being in an unfolded configuration.

The side support member 302A is oriented in a plane that is parallel to the plane of the flexible grill surface 102 and the end support member 301A. The side support member 302A may be pivoted between positions parallel to the end support member 301A (folded as shown in FIG. 3) and perpendicular to the end support member 301A (unfolded as shown in FIG. 4). Similarly, the leg support members 304A&B are oriented in a plane that is perpendicular to the plane of the flexible grill surface 102 and the end support member 301A. The leg support member 304A&B may be pivoted between positions parallel to the end support member 301A (folded as shown in FIG. 3) and perpendicular to the end support member 301A (unfolded as shown in FIG. 4). The second end frame member 104B comprises the same components that were described with respect to the first end frame member 104A, as will become apparent with reference to the following figures. Only the end support member 301B of the second end frame 104B is visible from the perspective illustrated in FIG. 3.

FIG. 4 is a perspective view showing the bottom-side of the exemplary roll-up grill 100 in an unrolled configuration with the end frame members 104A&B being in an unfolded configuration. Again, the grill surface 102 shown in this figure is simplified as compared to that shown in FIG. 2. As described with respect to FIG. 3, the first end frame member 104A comprises an end support member 301A, a side support member 302A, a proximal leg support member 304A and a distal leg support member 304B. Likewise, the second end frame member 104B comprises an end support member 301B, a side support member 302B, a proximal leg support member 304C and a distal leg support member 304D. In the unfolded configuration, the side support members 302A&B remain oriented in a plane that is parallel to the plane of the flexible grill surface 102 and the end support member 301A, but are pivoted to positions perpendicular to the end support members 301A&B. In the unfolded configuration, the leg support members 304A–D remain oriented in planes that are perpendicular to the plane of the flexible grill surface 102 and the end support member 301A, but are pivoted to positions perpendicular to the end support members 301A&B.

The ends 202A&B of the flexible grill surface 102 may be secured to the end support members 301A&B of the end frame members 104A&B, respectively. The pins 204 used to secure the flexible grill surface 102 to the end support member 301A may be seen protruding through holes 206 spaced laterally along the end support member 310A.

The first end support member 301A comprises a top flange 402A and a side flange 404A. Likewise, the second end support member 301B comprises a top flange 402B (not shown in FIG. 4) and a side flange 404B. The top flanges 402A&B are oriented in planes parallel to the plane flexible grill surface 102 (e.g., horizontal planes) and the side flanges 404A&B are oriented in planes perpendicular to the flexible grill surface 102 (e.g., vertical planes). The orientation of each top flange 402A&B with respect to its corresponding side flange 404A&B is such that they form a substantially right angle with respect to each other.

The first side support member 302A may be pivotally connected to the top flange 402A of the first end support member 301A by way of a rivet 306 or other fastener and may be oriented in a parallel plane with respect to that top flange 402A. The second side support member 302B may be pivotally connected to the top flange 402B of the second end support member 301B by way of a rivet 306 or other fastener and may be oriented in a parallel plane with respect to that top flange 402B. Those skilled in the art will appreciate that if the first side support member 302A is pivotally connected to the proximal end of the first end support member 301A, the second side support member 302B should be pivotally connected to the distal end of the second end support member 301B.

Each proximal leg support member 304A&C may be pivotally connected to the appropriate side flange 404A&B of end support members 301A&B at the proximal ends thereof by way of a rivet 306 or other fastener and may oriented in parallel planes with respect the side flanges 404A&B. Also, each distal leg support member 304B&D may be pivotally connected to the appropriate side flange 404A&B of the end support members 301A&B at the distal ends thereof by way of a rivet 306 or other fastener and may be oriented in a parallel planes with respect to the side flanges 404A&B.

Figure 5:
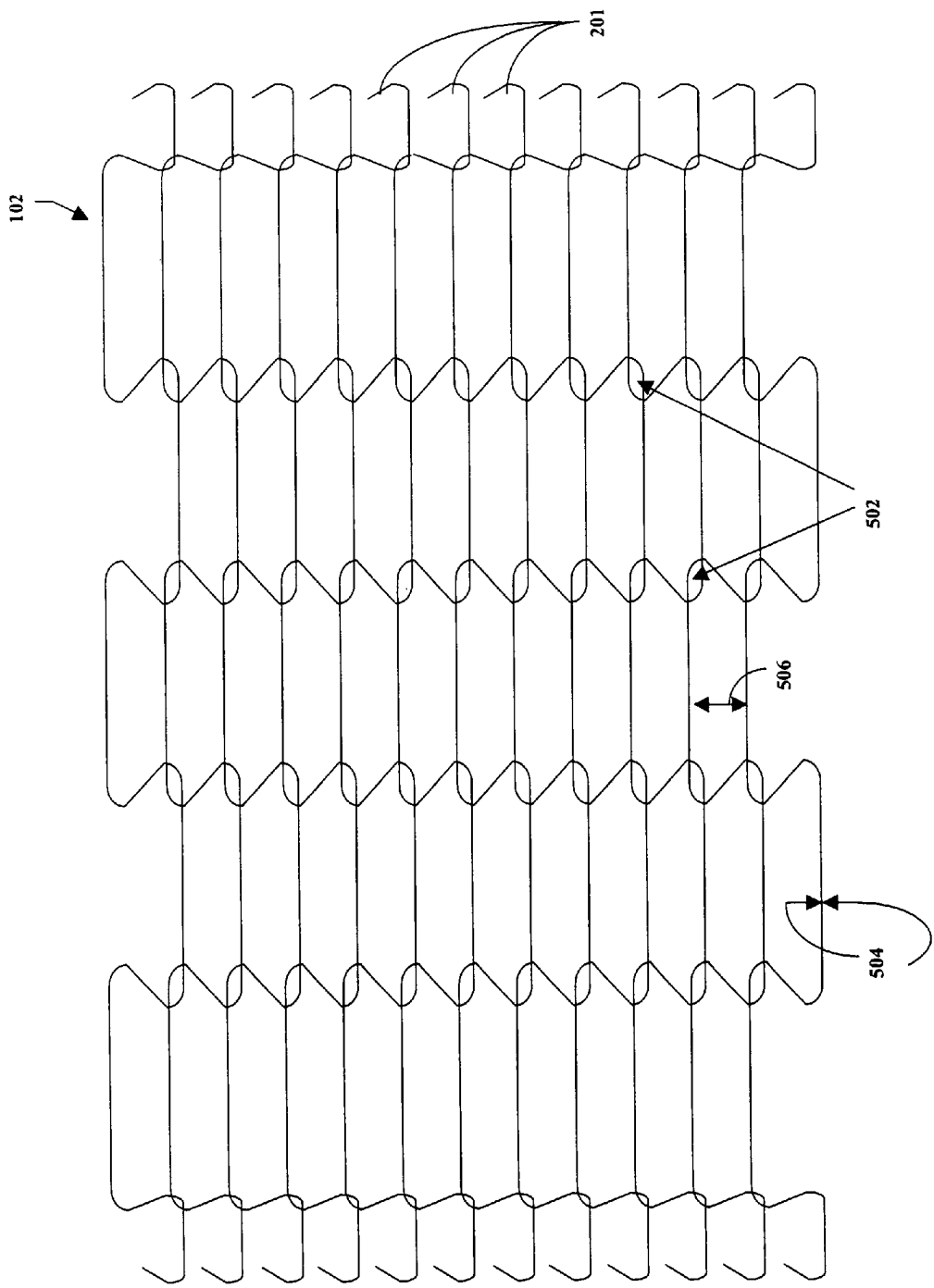
FIG. 5 is a plan view of an exemplary flexible grill surface used in accordance with the present invention.

FIG. 5 is a plan view of an exemplary flexible grill surface 102 used in accordance with the present invention. As mentioned, the flexible grill surface 102 may comprise any well-known and widely available form of wire mesh grid. In general terms, a wire mesh grid is formed of interwoven, laterally spaced, rigid steel zigzag wires 201. Such wire mesh grids are typically used in the construction of conveyor belts for conveying food and other items. Wire mesh grids are highly flexible and thus allow the roll-up grill 100 to roll into a compact substantially cylindrical shape.

Various configurations of wire mesh grids are widely available. Wire mesh grids differ mainly by the spacing of the wire weaves that run longitudinally down the grid and define the lateral spaces. Wire meshes are also distinguished by the diameter 504 of the zigzag wires 201. A typical zigzag wire diameter 504 is on the order of hundredths of an inch. The longitudinal spacing between zigzag wires 201 is referred to as pitch 506. The pitch 506 of a particular wire mesh grid is generally defined by the number of zigzag wires 201 per foot. Another distinguishing characteristic of a wire mesh grid is its edges. Two common configurations of wire mesh grids include a single loop edge (as shown in FIG. 5), and a double loop edge. Those skilled in the art will appreciate that the present invention contemplates use of any configuration of wire mesh grid as the flexible grill surface 102. Also, flexible grill surfaces 102 other than wire mesh grids may be employed.

Figure 6:
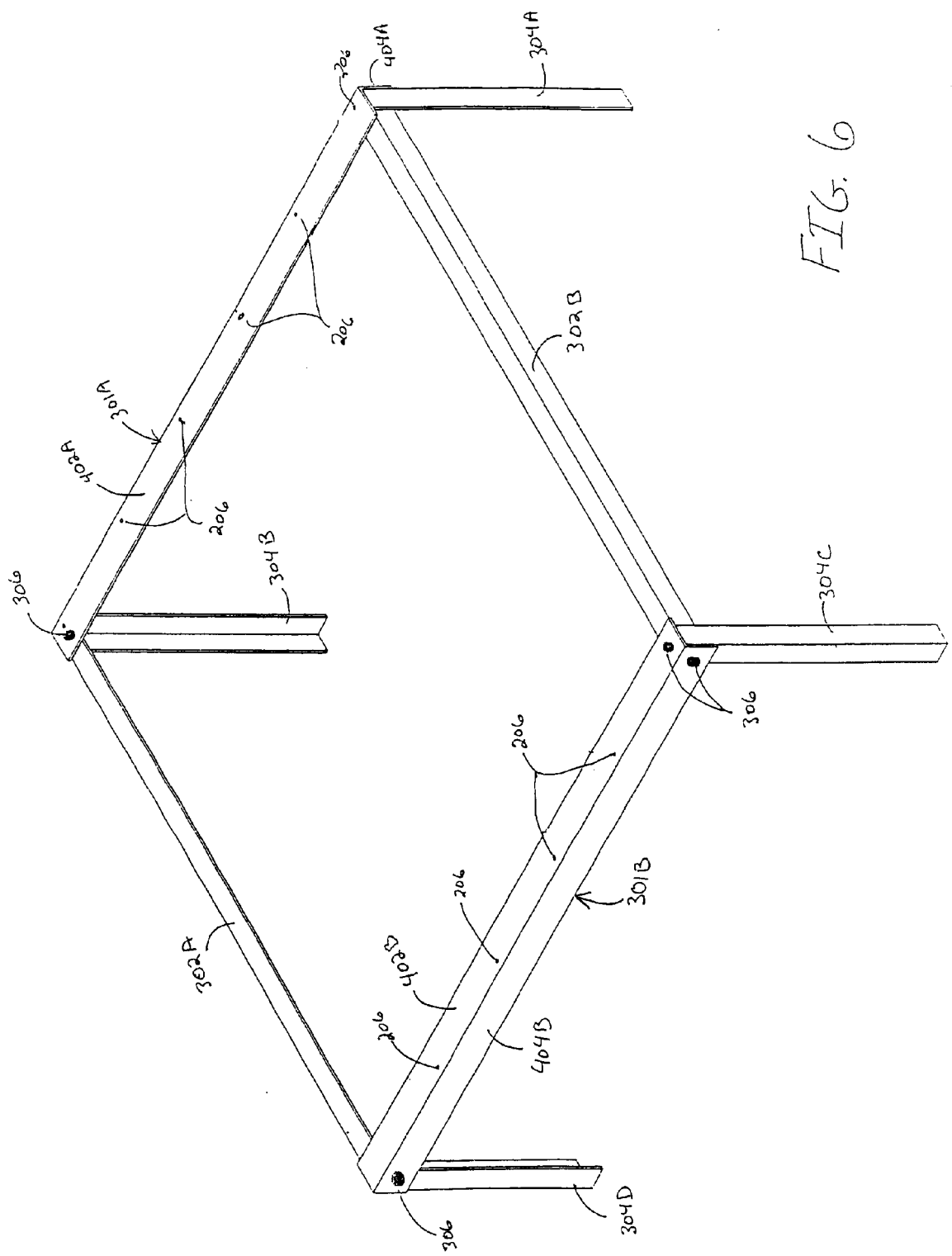
FIG. 6 is a perspective view of the support frame in an unfolded configuration.

FIG. 6 is a perspective view of the support frame in an unfolded configuration. Again, the support frame components include a first end support member 301A, a second end support member 302B, a first side support member 302A, a second side support member 302B, and four leg support members 304A–D. The first end support member 301A may comprise a top flange 402A and a side flange 404A. Likewise, the second end support member 301B may comprise a top flange 402B and a side flange 404B. Holes 206 may be laterally spaced across the top flanges 402A&B for receiving pins 202 (not shown in FIG. 6) that secure the flexible grill surface 102 (not shown in FIG. 6) to the end support members 301A&B. The first side support member 302A may be pivotally connected to one end of the top flange 402A of the first end support member 301A by way of a rivet 306 or other fastener. The second side support member 302B may be pivotally connected to one end of the top flange 402B of the second end support member 301B by way of a rivet 306 or other fastener. Leg support members 304A–D may be pivotally attached to the appropriate side flanges 404A&B of the end support members 301A&B by way of rivets 306 or other fasteners. The support frame components are preferable made of aluminum or an alloy so as to be lightweight and heat tolerant. Other suitable materials for construction of the support frame components will occur to those of skill in the art and are therefore contemplated by the present invention.

Thus, it may be seen that the first end support member 301A, the first side support member 302A, and the corresponding two leg support members 304A&B are structured and arranged so as to be capable of being selectively arranged in a collapsed or folded configuration. Likewise, the second end support member 301B, the second side support member 302B, and the corresponding two leg support members 304C&D are structured and arranged so as to be capable of being selectively arranged in a collapsed or folded configuration. Further, the first side support member 301A and the corresponding two leg support member 302A&B are substantially juxtaposed to one another and are alternatively arranged in an expanded or unfolded configuration. The second side support member 301B and the corresponding two leg support member 302C&D are substantially juxtaposed to one another and are alternatively arranged in an expanded or unfolded configuration. When expanded or unfolded, the end support members 301A&B and side support members 302A&B combine to form a rigid four-sided frame supporting the flexible grill surface 102 and the leg support members 304A–D provide elevating support to the flexible grill surface.

Figure 7:
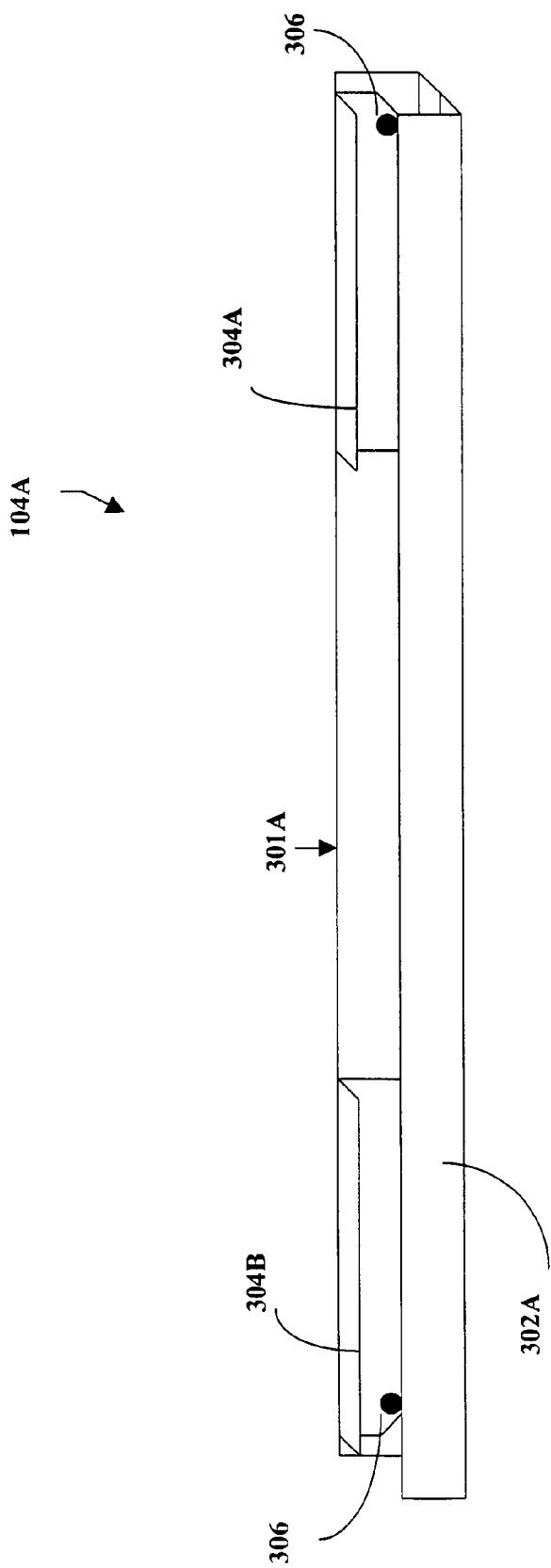
FIG. 7 is a perspective view of an end frame member in a folded configuration.

FIG. 7 is a perspective view of an end frame member 104A in a folded configuration. As shown, the end frame member 104A comprises an end support member 301A, a side support member 302A, and two leg support members 304A&B. The a side support member 302A and two leg support members 304A&B are pivotally attached to the end support member 301A by way of rivets 306 or other suitable fasteners. In the shown folded configuration, the end support member 301A, a side support member 302A, and two leg support members 304A&B are all substantially parallel to one another.

Figure 8:
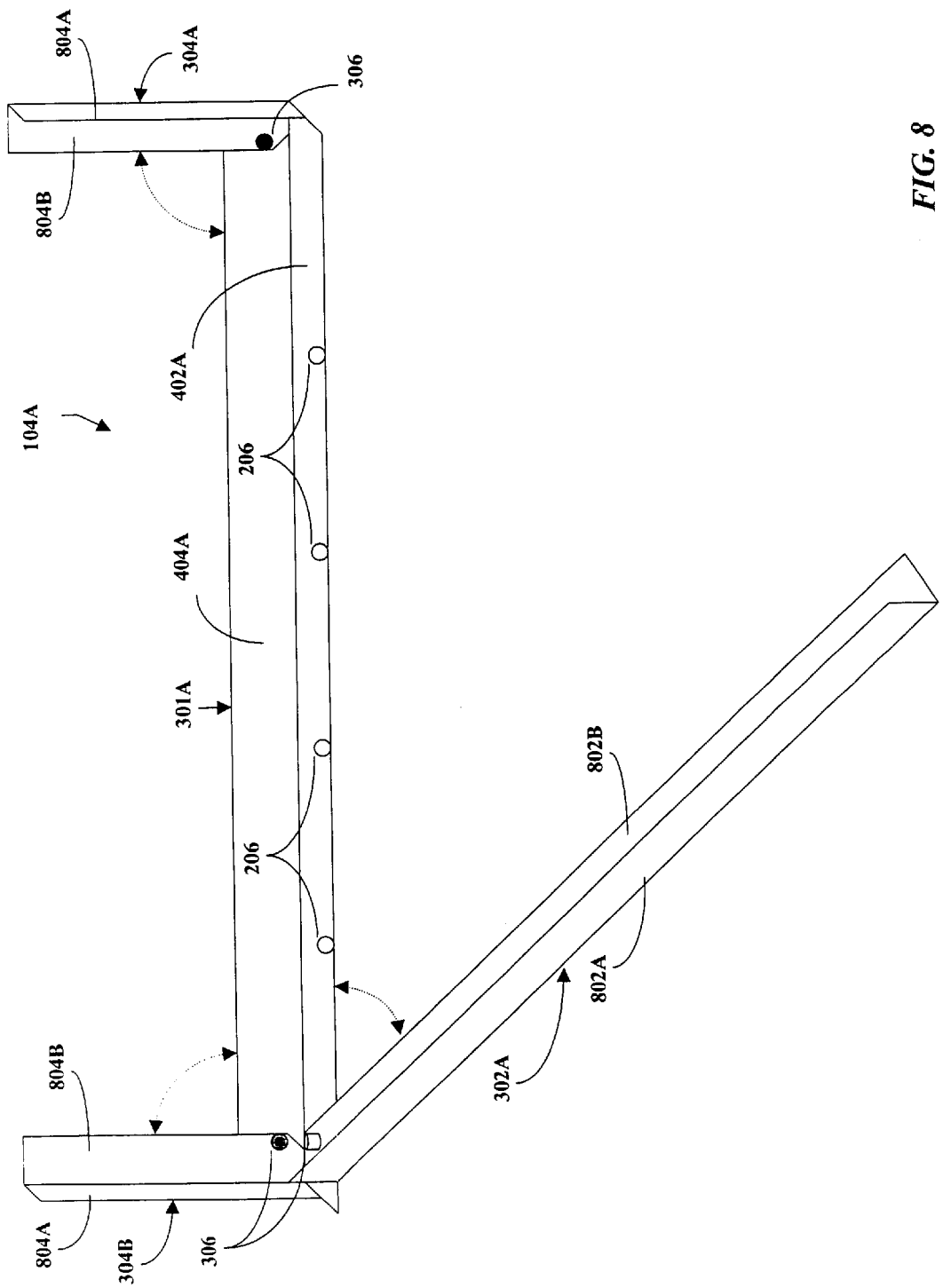
FIG. 8 is a perspective view of an end frame member in a semi-unfolded configuration.

FIG. 8 is a perspective view of an end frame member 104A in a semi-unfolded configuration. FIG. 8 demonstrates that the side support member 302A is pivotally connected to the end support member 301A, such that it may pivot in a plane parallel to the end support member 301A from its folded position parallel to the end support member 301A (shown in FIG. 7, for example) toward an unfolded position that is perpendicular to the end support member 301A. FIG. 8 also demonstrates that the leg support members 304A&B may be pivotally connected to the end support member 301A, such that they may pivot in a plane perpendicular to the end support member 301A from their folded positions parallel to the end support member 301A (shown in FIG. 7, for example) toward their unfolded positions perpendicular to the end support member 301A.

In a preferred embodiment, the leg support members 304A&B and the side support member 302A comprise L-shaped members having two perpendicular flanges, similar to the end support member 301A. In particular, the side support member 302A may comprise a side flange 802A and a top flange 802B. Each support leg member 304A–D may comprise a first side flange 804A and a second side flange 804B. When in an unfolded configuration (see FIG. 8 and FIG. 4) the flanges of the side support member 302A and the leg support member 304A may align so as to impede unintended movement of the corresponding support members. More specifically, the side flange 802A of the unfolded first side support member 302A may be positioned against the first side flanges 804A of the unfolded distal leg support members 304A&D so as to impede the unfolded distal leg support members 304A&D from being re-folded until the first side support member 302A is at least partially re-folded. Also, the first side support member 302A may be held in its unfolded configuration by the rivet 306 (not shown in FIG. 8) that pivotally connects the opposite distal leg support member 304D (not shown in FIG. 8) to the second end support member 301B (i.e., the protruding rivet 306 impedes the first side support member 302A from being unintentionally re-folded). Likewise, although not shown in FIG. 8, the side flange 802A of the second unfolded side support member 302B may be positioned against the first side flanges 804A of the unfolded proximal leg support members 304B&C so as to impede the unfolded proximal leg support members 304B&C from being re-folded until the second side support member 302B is at least partially re-folded. The unfolded second side support member 302B may be held in its unfolded configuration by the rivet 306 that pivotally connects the opposite distal leg support member 304B to the first end support member 301A. Accordingly, the flanges of the support members may be strategically shaped and configured so that the roll-up grill 100 will remain in a "locked" and stable unfolded (expanded) configuration until the user physically and intentionally causes it to be re-folded (collapsed) into a collapsed configuration.

Although the present invention has been described with reference to certain exemplary embodiments thereof, those skilled in the art will recognize that changes may be made in form and detail without departing from the spirit and scope of the invention. The specific embodiments described herein are thus given by way of example only. The invention is to be limited only as defined by the following claims.

What is claimed is:

1. A roll-up grill having an integral and foldable frame comprising:
    a flexible grill surface having a first end, a second end, a first side and a second side, the flexible grill surface capable of being rolled-up into a substantially cylindrical shape with the first side and the second side forming the curved portions thereof;
    a first end frame member attached laterally to the first end of the flexible grill surface;
    a second end frame member attached laterally to the second end of the flexible grill surface;
    wherein the flexible grill surface, the first end frame member and the second end support member are oriented in a parallel plane; and
    wherein the first end frame member and the second end frame member each comprise:
        an end support member having a proximal end and a distal end,
        a side support member pivotally connected to one of the proximal end or the distal end of the end support member, the side support member being oriented in a parallel plane with respect to the end support member such that the side support member may be pivoted between positions parallel and perpendicular to the end support member,
        a proximal leg support member being pivotally connected to the end support member at the proximal end, the proximal leg support member being oriented in a perpendicular plane with respect to the end support member such that the proximal leg support member may be pivoted between positions parallel and perpendicular to the end support member, and
        a distal leg support member being pivotally connected to the end support member at the distal end, the distal leg support member being oriented in a perpendicular plane with respect to the end support member such that the distal leg support member may be pivoted between positions parallel and perpendicular to the end support member.

2. The roll-up grill of claim 1, wherein the flexible grill surface comprises a wire mesh grid.

3. The roll-up grill of claim 2, wherein the wire mesh grid is constructed from stainless steel.

4. The roll-up grill of claim 1, wherein the end support member, the side support member, the proximal leg support member and the distal leg support member are constructed from aluminum.

5. The roll-up grill of claim 1, wherein the end support member, the side support member, the proximal leg support member and the distal leg support member are constructed from alloys.

6. The roll-up grill of claim 1, wherein the end support member comprises a top flange and a side flange, the top flange being oriented in a horizontal plane parallel to the flexible grill surface and the side flange being oriented in a vertical plane such that the top flange and the side flange form a substantially right angle with respect to each other;
    wherein the side support member is pivotally connected to the top flange of the end support member and is oriented in a parallel horizontal plane with respect to the top flange;
    wherein the proximal leg support member is pivotally connected to the side flange of the end support member at the proximal end and is oriented in a parallel vertical plane with respect to the side flange; and
    wherein the distal leg support member is pivotally connected to the side flange of the end support member at the distal end and is oriented in a parallel vertical plane with respect to the side flange.

7. The roll-up grill of claim 1, wherein the first end frame member is attached laterally to the first end of the flexible grill surface by way of pins that are interwoven through the first end of the flexible grill surface and inserted into holes laterally spaced across the first end frame member; and wherein the second end frame member is attached laterally to the second end of the flexible grill surface by way of pins that are interwoven through the second end of the flexible grill surface and inserted into holes laterally spaced across the second end frame member.

8. The roll-up grill of claim 7, wherein the pins are constructed from stainless steel.

9. The roll-up grill of claim 1, wherein the first end frame member and the second end frame member remain attached to the flexible grill surface when the flexible grill surface is rolled-up into a substantially cylindrical shape.

10. The roll-up grill of claim 9, wherein the side support member, the proximal leg support member and the distal leg support member are positioned parallel to the end support member when the flexible grill surface is rolled-up into a substantially cylindrical shape.

11. The roll-up grill of claim 1, wherein the side support member, the proximal leg support member and the distal leg support member are positioned perpendicular to the end support member when the flexible grill surface is in an unrolled configuration.

12. A roll-up grill having an integral and foldable frame comprising:

a flexible grill surface having a first end, a second end, a first side and a second side;

a first end frame member attached laterally to the first end of the flexible grill surface;

a second end frame member attached laterally to the second end of the flexible grill surface;

the flexible grill surface, the first end frame member and the second end frame member are structured and arranged so as to be capable of being selectively rolled-up into an rolled-up configuration, wherein the flexible grill surface, the first end frame member and the second end frame member have a substantially cylindrical shape, and alternatively unrolled into an unrolled configuration, wherein the flexible grill surface, the first end frame member and the second end frame member are oriented in a parallel plane; and wherein the first end frame member and the second end frame member each comprise:

an end support member attached laterally to the flexible grill surface, a side support member pivotally connected to one end of the end support member, p2 a first leg support member pivotally connected to the end support member at the one end, and p2 a second leg support member being pivotally connected to the end support member at another end of the end support member, the end support member, the side support member, the first leg support member, and the second leg support member being structured and arranged so as to be capable of being selectively arranged in a collapsed configuration the side support member, the first leg support member, and the second leg support member are substantially juxtaposed to one another, and alternatively being arranged in an expanded configuration wherein the end support members and side support members form a rigid four-sided frame supporting the flexible grill surface and the first leg support members and the second leg support members provide elevating support to the flexible grill surface.

13. The roll-up grill of claim 12, wherein in the expanded configuration the side support member impedes the first leg support member and the second leg support member from being collapsed until the side support member is collapsed.

14. The roll-up grill of claim 12, wherein in the expanded configuration the side support member pivotally connected to the first end frame member is impeded from being unintentionally collapsed by a first rivet secured to the second end frame member; and wherein in the expanded configuration the side support member pivotally connected to the second end frame member is impeded from being unintentionally collapsed by a second rivet secured to the first end frame member.

15. The roll-up grill of claim 14, wherein with respect to the first end frame member, the second rivet pivotally connects the second leg support member to the end support member; and wherein with respect to the second end frame member, the first rivet pivotally connects the first leg support member to the end support member.

* * * * *